May 7, 1957  J. I. MICHAELS ET AL  2,791,341
TRACTOR MOUNTED POWER UNIT
Filed Nov. 18, 1954  3 Sheets-Sheet 1
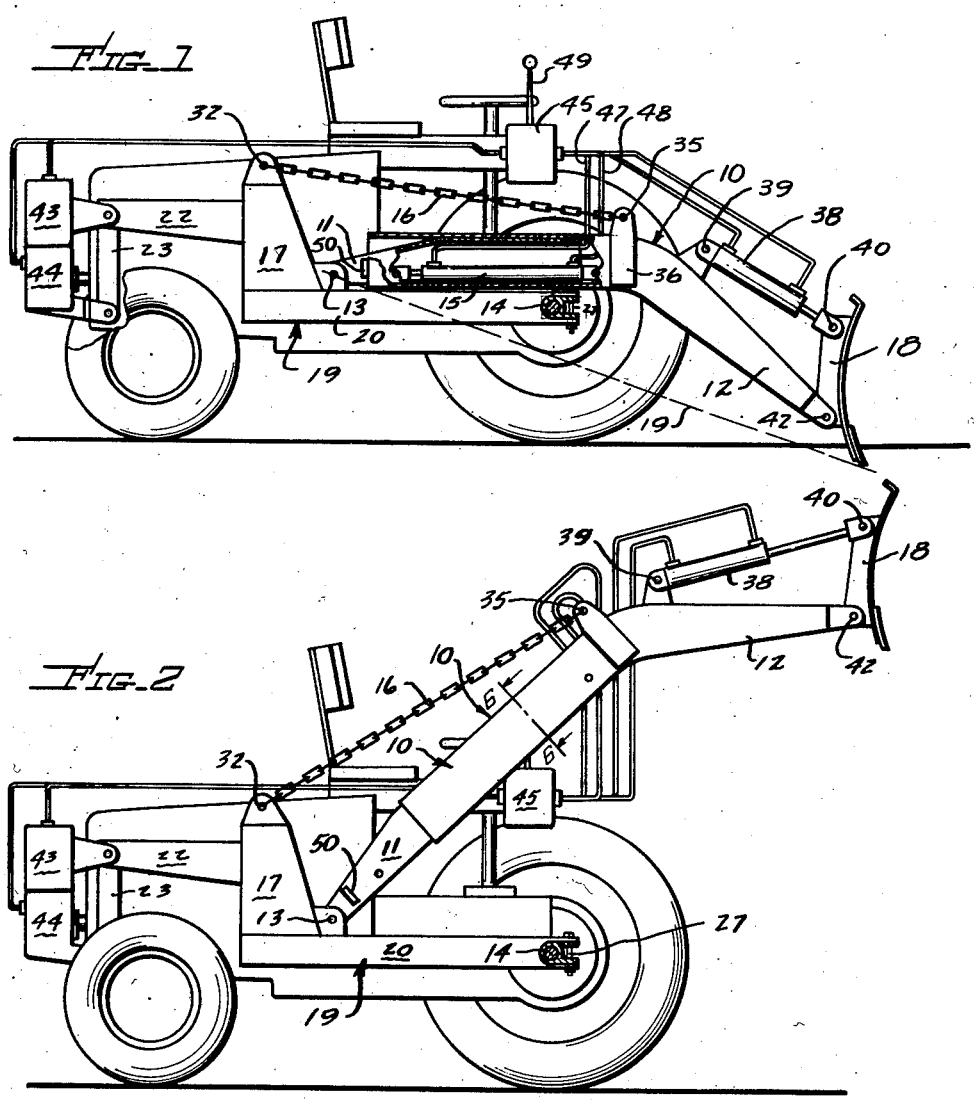
CHARLES J. DAVIS
JOHN I. MICHAELS
CARL A. LOESCH
INVENTOR
BY Hubert Miller May 7, 1957  J. I. MICHAELS ET AL  2,791,341
TRACTOR MOUNTED POWER UNIT
Filed Nov. 18, 1954  3 Sheets-Sheet 2
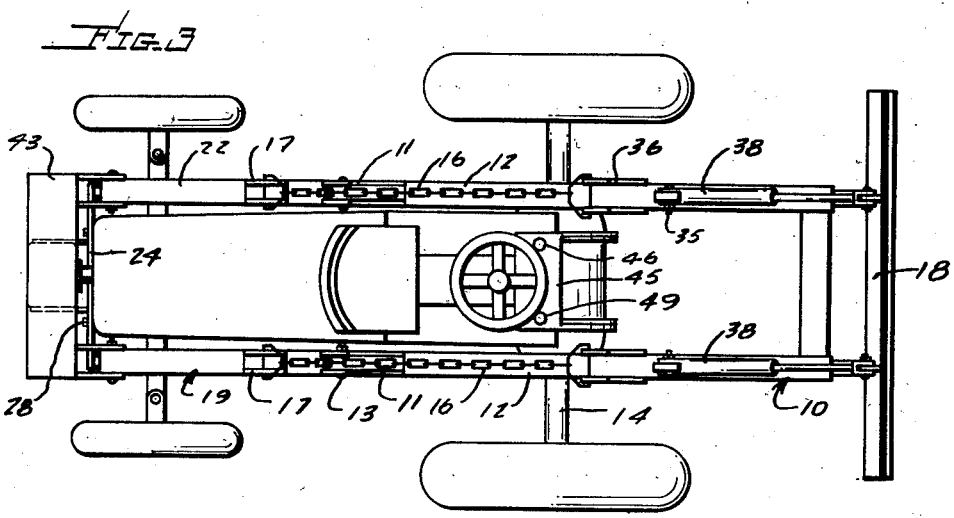
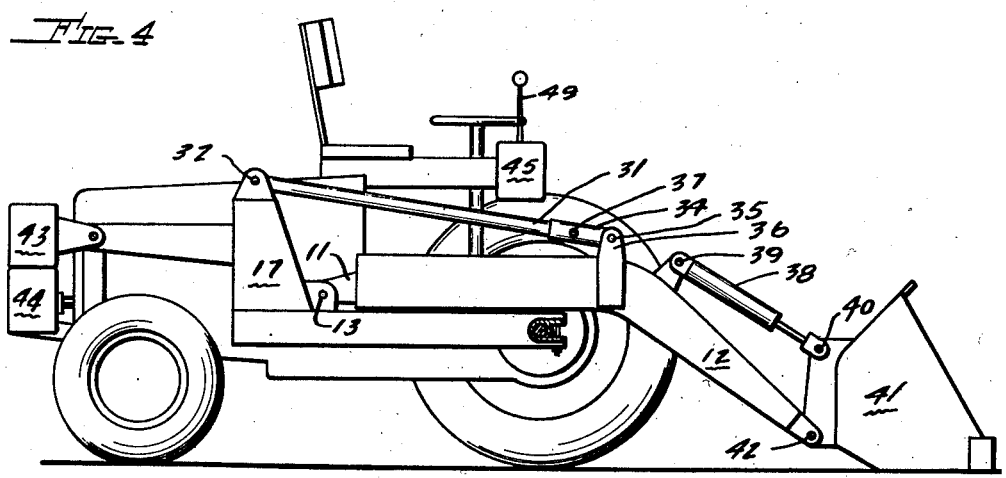
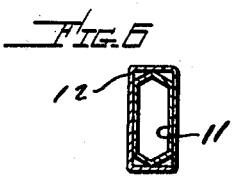
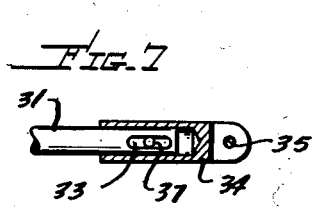
CHARLES J. DAVIS
JOHN I. MICHAELS
CARL A. LOESCH
INVENTOR
BY *Hubert Miller*

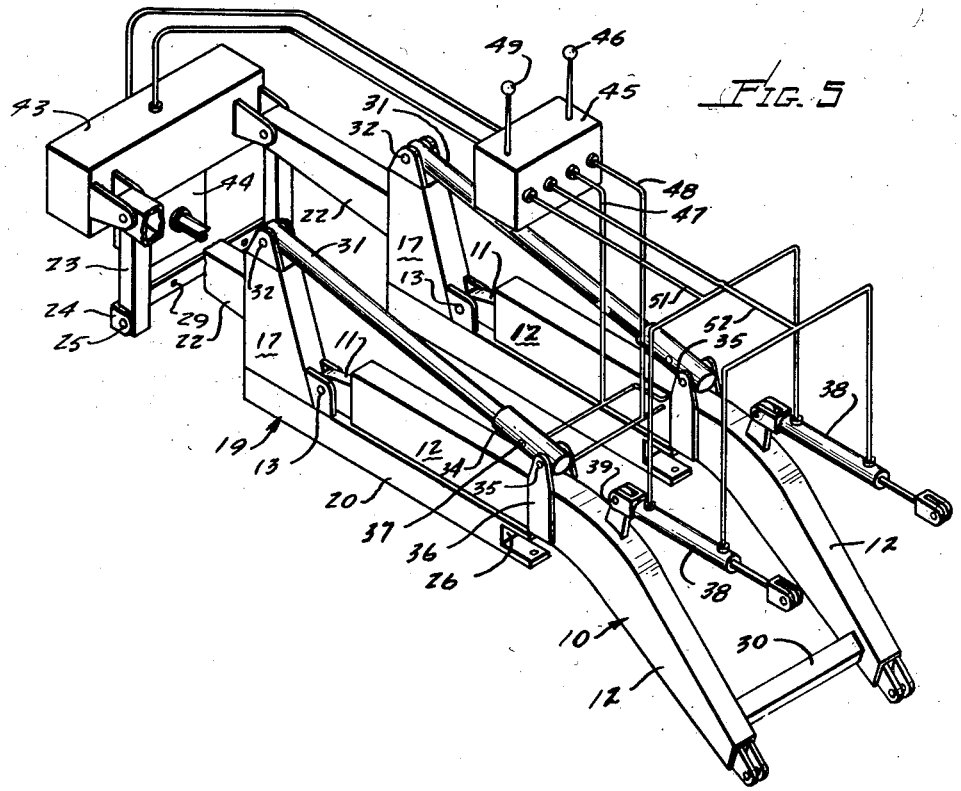

United States Patent Office 2,791,341
Patented May 7, 1957

2,791,341

TRACTOR MOUNTED POWER UNIT

John I. Michaels and Charles J. Davis, Wichita, and Carl A. Loesch, Argonia, Kans., assignors to Mid-Western Industries, Inc., Wichita, Kans., a corporation of Kansas Application November 18, 1954, Serial No. 469,587

7 Claims. (Cl. 214—141)

This invention relates to improvements in boom type power tools for tractors, in which the boom serves to transmit tractor produced thrust when lowered, and in which the boom may also serve to elevate a load from the ground or other tractor supporting surface. This invention, in other words, relates to so called loaders, as well as to bull dozer type tools.

A primary object of the invention is to provide a thrust transmitting device which is so designed that thrust is transmitted from the tractor to a tool supported by the outer end of the boom along a thrust line which passes through or beneath the tractor drive wheel axis, thus obviating any tendency for either end of the tractor to be lifted off the ground by thrust resistance during a bull dozing or loading operation.

Another object is to provide a tool which includes a telescoping boom the length of which may be increased by power means to facilitate forcing the tool into a ground load to break loose packed material while the tractor remains stationary.

Another object is to provide a tool of this class in which the power means for increasing boom length also serves as the means for forcing the boom to pivot about its tractor mounted axis to elevate the outer end of the boom, and to thereby lift a load from the ground.

Still another object is to provide a tool of this character in which the various parts are so proportioned and arranged, and the weight is so distributed, that the load is transmitted primarily to the drive wheels of the tractor, thus materially increasing the ground traction of those wheels.

The invention, together with other objects, will be more clearly understood when the following description is read in connection with the accompanying drawings, in which:

Fig. 1 is a side elevation of a tractor showing one embodiment of the invention operably mounted thereon, certain parts being shown in section to show details of construction;

Fig. 2 is a similar view showing the boom elevated;

Fig. 3 is a plan elevation of the Fig. 1 embodiment of the invention;

Fig. 4 is a side elevation of a tractor illustrating a second embodiment of the invention mounted thereon;

Fig. 5 is a perspective view of the Fig. 4 embodiment removed from the tractor, and schematically illustrates the fluid power means for operating both embodiments;

Fig. 6 is a lateral sectional view through one of the side members of the extensible boom which constitutes a part of the invention; and Fig. 7 is a fragmentary sectional view through one type of tension link which constitutes a part of the invention.

General description

In general the invention includes an extensible boom 10 (Figs. 1, 2 and 3) which includes a pair of identical side members made up of slidably connected inner sections 11, and outer sections 12. The inner ends of the inner sections 11 are pivotally connected to the tractor on a common transverse pivot axis 13 located intermediate the ends of the tractor. The level of this axis is very near the level of the tractor drive wheel axis 14. This is an important feature of the invention because it materially lowers the direct thrust line between the working end of the boom, when lowered, and the point on the tractor to whch said thrust is transmitted. When this thrust line passes through or below the tractor wheel axis the thrust transmitted by the tractor to the lowered boom end has no tendency to lift the tractor drive wheels from their supporting surface. This provides greater drive wheel traction and consequently permits the tractor to apply greater forward thrust to the lowered boom end.

Elongation and contraction of the boom is accomplished by double acting pressure fluid cylinders 15, one for each boom side member. One end of each cylinder is connected to a section 12 and the plunger rod is connected to a section 11. The cylinders operate simultaneously.

A pair of tension links 16 each has one end connected to a boom section 12, and its opposite end connected to a tractor mounted upright 17 at a point spaced from the boom pivot axis 13. The length of these tension links is such as to permit the forward end of the boom to be lowered sufficiently that a thrust absorbing working tool 18, (in this case a bulldozer blade) may extend below ground level, as clearly shown in Fig. 1. Naturally when the working edge of the tool is at ground level the tension members 16 are slack, and the boom may be extended in length before the tension members 16 are actually placed in tension.

As clearly seen in Fig. 2, when the boom is extended the tension members 16, being non-extensible, force the boom to pivot about its pivot point 13, and to lift the tool 18 or other structure supported by the outer end of the boom. When the boom is again shortened in length by cylinders 15 the boom is lowered. It should be noted that when the boom is in the Fig. 1 position, and the tractor is moved forward, thrust can only be transmitted between the working edge of the tool 18 and the boom pivot point 13 along a thrust line 19 which passes through or below the tractor drive wheel axis 14. The relatively low level at which the boom is pivotally connected to the tractor thus eliminates any tendency for the drive wheels to be lifted from the ground or other tractor supporting surface.

Construction details

While the above described tool may be mounted on the tractor in any suitable manner, we prefer to provide a unitary assembly which not only includes the above mentioned elements but also includes a boom supporting frame which is designed for direct attachment to the tractor. The design details of such a preferred assembly are clearly shown in Fig. 5.

The frame 19 includes a pair of identical elongated side members disposed in substantially parallel relationship, and each of which includes a horizontal member 20, a rigid upright 17, a horizontal member 22, and an upright 23. These two frame side members are connected together at their forward ends by a rigid cross bar 24, the opposite ends of which are connected respectively to the two frame uprights 23 by means of pins or rivets 25. The aft ends of horizontal frame members 20 are bifurcated, as at 26, to receive and anchor the tractor axle housing 14 at opposite sides of the tractor chassis. The anchorage is accomplished by means of bolts 27 (Fig. 2). The forward end of this frame is secured to the tractor by bolts 28 (Fig. 3) which pass through perforations 29 (Fig. 5) in cross bar 24, and thru registering holes in fixed tractor structure.

Again referring to Fig. 5, the boom side members are pivoted at 13 near the respective lower ends of uprights 17. The outer ends of the boom side members are rigidly connected together by a cross bar 30 which has its opposite ends welded or otherwise secured to boom sections 12. Boom inner sections 11 slidably telescope into the ends of boom sections 12, and both sections are hollow as clearly shown in section in Fig. 6. This renders the boom highly resistant to both bending and torsional loads.

In the Fig. 4 and 5 embodiments a different form of tension link 31 is provided. This link includes a rigid tube which has one end pivotally connected at 32 to frame upright 17 at a point spaced above boom pivot axis 13. The other end of the tube is provided with an elongated laterally extending slot 33 (Fig. 7), and slidably telescopes into one end of a sleeve 34. The opposite end of sleeve 34 is pivotally connected at 35 to a bracket 36 which is welded to boom section 12. A cross pin 37 passes through slot 33 (Fig. 7), and has its opposite ends press fitted into alined apertures in the sleeve 34. The length of slot 33 is such that pin 37 stops intermediate its ends when the boom is lowered to place tools 18 or 41 in ground contact. This lost motion arrangement at the end of link 31 prevents the link from transmitting thrust between anchor points 32 and 35, and allows the link to serve only as a true tension member, similar to the chain 16 in the Fig. 1 and 2 embodiment.

Both embodiments include a pair of tool tilting cylinders 38, each having an end pivotally connected at 39 to a boom section 12, and having its plunger rod end pivotally connected at 40 to the dozer blade 18 (Figs. 1 and 2) or to the combination digging and load lifting bucket 41 (Fig. 4) at a point spaced from the pivot pins 42 by means of which both are secured to the outer end of the boom.

Both embodiments of the invention include a frame supported hydraulic fluid reservoir 43, an engine driven frame supported hydraulic pump 44, a hydraulic fluid pressure control valve 45, and fluid pressure and return lines connecting the pump, the reservoir, the valve and the various double acting fluid pressure cylinders in a conventional manner.

By moving valve control lever 46 (Fig. 5) toward the tool supporting end of the boom pressure fluid is conducted through line 47 to the forward ends of both cylinders 15, and the boom is shortened in length and is lowered toward the Fig. 1 position. By moving lever 46 in the opposite direction fluid flows through line 48 to the opposite ends of cylinders 15 and the boom is lengthened and raised toward the Fig. 2 position.

Similarly, movements of control lever 49 either lengthen or shorten cylinder assemblies 38 by directing pressure fluid through lines 51 or 52. This in turn forces the working tools 18 or 41 to pivot in one or the other direction about their respective pivot mountings 42 (Figs. 1 and 4).

It should be noted that the Fig. 1 and 2 embodiment includes a fixed outwardly projecting stop 50 located near the pivoted end of each boom section 11. These stops limit the contraction or shortening of the boom when the adjacent ends of boom sections 12 contact the stops. They also thus serve to transmit thrust from the inner boom sections 11 to the outer boom sections 12.

In the Fig. 4 and 5 embodiment the stops 50 are omitted. In this embodiment the two cylinder assemblies 15 serve as the sole means for limiting the shortening of the boom, and as the means for transmitting thrust from the inner boom sections 11 to the outer boom sections 12. This is accomplished by making the respective plunger rods of the cylinders 15 of such length that the ends of the plungers will contact the ends of their respective cylinders when the boom length has shortened the desired extent.

Modifications of the invention other than those discussed will be apparent to those skilled in this art. It is not intended to limit the invention to a combination with a tractor mounted frame assembly because the essential elements of the invention can be mounted directly on the tractor structure, as previously mentioned. It is intended to limit the scope of the invention only by the appended claims.

Having by the above specification disclosed the invention with sufficient clarity to enable those familiar with this art to construct and use it, we claim:

1. A tractor-mounted power unit comprising an extensible boom extending lengthwise from a pivot connection intermediate the ends of the tractor toward a tractor drive wheel axis and having an outer end extending to a point well beyond that axis, power operated means connected to the boom for selectively increasing and decreasing its length, and a link capable of transmitting tension loads only, having one end connected to the forward portion of the boom and the other end connected to the tractor at a point above the level of the boom pivot axis to curb the increase in boom length and to force the boom to pivot upward about its axis when its length is increased, and a ground-working tool mounted on the boom beyond said tractor drive wheel axis and positioned thereon to create a thrust in said unit along a line passing beneath said tractor drive wheel axis to the pivot point of the boom when the ground-working tool is engaged with the tractor supporting surface and the tractor is moved in the direction of boom extension.

2. A tractor-mounted power unit comprising a multiple section extensible boom, including inner and outer sections, the inner section having a transverse pivot connection to the tractor intermediate the ends thereof, said boom extending from said pivot connection toward and beyond a tractor drive wheel axis, power means for moving the outer boom section longitudinally with relation to the inner boom section to increase and decrease the overall length of the boom, and a link capable of transmitting tension loads only having one end connected to the tractor at a point above the level of the boom pivot connection and its other end connected to the outer section of the boom to curb boom extension and to thus force the boom to pivot upwardly as its length is increased by said power means, and means carried by the outer end of the boom to engage the surface on which the tractor is supported when the boom is lowered to create a thrust in said unit when the tractor is moved in the direction of extension of said boom, said means being positioned on said boom relative to said boom pivot so that the line of thrust from such means to said boom pivot passes beneath said tractor drive wheel axis.

3. The unit described in claim 2 in which the power means for increasing and decreasing boom length is a fluid-operated cylinder having one end connected to one boom section, a plunger within said cylinder having a rod attached to the plunger and extending through the other end of the cylinder and connected to the other boom section, said boom sections being hollow and telescopically connected and the cylinder and plunger being housed within said hollow sections.

4. A tractor-mounted thrust transmitting unit comprising a boom having one end pivotally connected to the tractor at a point thereon in longitudinal spaced relation to a tractor drive wheel axis, the outer free end of the boom extending toward and above the drive wheel axis to a point beyond said drive wheel axis and thence downwardly at an angle toward the tractor supporting surface, a ground-working tool mounted on the outer free end of the boom in position with relation to the location of the boom pivot such that thrust developed in the unit by said tool when the tractor is moved in the direction of boom extension with the tool in engagement with the tractor-supporting surface is transmitted from said ground-engaging tool to the boom pivot along a line which passes beneath the tractor drive wheel axis.

5. The tractor-mounted thrust transmitting unit described in claim 4 including power means for raising the boom to lift the ground-engaging tool out of contact with the tractor-supporting surface.

6. In a tractor-mounted power unit, an extensible boom having front and rear slidably connected sections, power means for moving one boom section longitudinally with relation to the other to increase and decrease the length of said boom, a rigid upright fixed on the tractor intermediate its ends, a transverse pivot connecting one section of the boom to said upright and the other section of the boom extending longitudinally of the tractor above and beyond a tractor drive wheel axis, a ground-working tool supported by the front section of the boom and a link capable of transmitting tension loads only, having one end connected to said upright at a level higher than the boom pivot axis and having its other end connected to the front section of the boom remote from the boom pivot to curb extension and to force the boom to pivot upwardly around its pivot as its length is increased by said power means, said ground-working tool having a surface adapted to contact the tractor-supporting surface when the boom is lowered and to develop a thrust in said unit when the tractor is moved in the direction of boom extension, the line of thrust between said ground-engaging tool and said boom pivot passing beneath said tractor drive wheel axis.

7. A tractor-mounted power unit comprising a pair of longitudinally extending boom members, one disposed along each side of the tractor, each boom member including two hollow telescopic sections, the rear ones of which are pivoted on a common transverse axis intermediate the ends of the tractor, said rear sections of the booms supporting the respective forward sections thereof for arcuate up and down movement at their forward ends, said boom members extending to a point beyond a tractor drive wheel axis, a ground-working tool supported by the forward ends of the two boom members beyond said tractor drive wheel axis, power lifting means to simultaneously and equally extend the length of both boom members, and two links each capable of transmitting tension loads only, and each having one end connected to a respective forward boom section and having its opposite end connected to the tractor along a common transverse axis which is spaced above the level of the common transverse pivot axis of the boom members whereby when the length of the two boom members is increased by the power means, the links are placed in tension and force the boom members to move upwardly about their common axis to raise the ground-working tool in an arc, said ground-working tool being supported by said boom members in a position such that the line of thrust developed by the tool and the common transverse pivot axis of the boom members when the tractor is moved in the direction of boom extension with the ground-working tool in engagement with the tractor-supporting surface, passes beneath said tractor drive wheel axis.

References Cited in the file of this patent

UNITED STATES PATENTS

| | | |
|---|---|---|
| Re. 23,726 | Lindeman | Oct. 20, 1953 |
| 2,296,827 | Andersen et al. | Sept. 29, 1942 |
| 2,344,584 | Austin | Mar. 21, 1944 |
| 2,456,491 | Collins | Dec. 14, 1948 |
| 2,531,993 | Smith | Nov. 28, 1950 |
| 2,559,816 | Alexander | July 10, 1951 |
| 2,624,132 | Henry | Jan. 6, 1953 |
| 2,627,989 | Chaves | Feb. 10, 1953 |
| 2,645,369 | Allan | July 14, 1953 |

FOREIGN PATENTS

| | | |
|---|---|---|
| 1,049,753 | France | Aug. 26, 1953 |